Patented Aug. 25, 1936

2,051,877

UNITED STATES PATENT OFFICE 2,051,877

MODIFIED COMPOSITIONS

Barnard M. Marks, Arlington, N. J., assignor to Dupont Viscoloid Company, Wilmington, Del., a corporation of Delaware No Drawing. Application June 30, 1934, Serial No. 733,239

5 Claims. (Cl. 106—37)

This invention relates to modified compositions and the preparation of same and, more particularly, to cellulose derivative or resin compositions containing, as a modifier therefor, i. e., either a plasticizer or a high boiling solvent, one or more esters of the class hereinafter described.

An object of the present invention is to provide new modified compositions containing, as plasticizers or high boiling solvents therein, esters which are highly compatible with ordinary plastic materials used in the coating, film, and plastic arts, which esters have low vapor pressures and otherwise acceptable properties. A further object is to provide new cellulose derivative and resin compositions. Other objects will be apparent from the description given hereinafter.

The above objects are accomplished according to the present invention by employing, as a modifier in cellulose derivative and resin compositions, an ether derivative of an ester of a hydroxy monocarboxylic acid represented by the formula $R_1OR_2COOR_3$, where $R_1$ is an aryl or aralkyl radical containing not more than 10 carbon atoms, $R_2$ is a divalent hydrocarbon radical containing not more than 17 carbon atoms, and $R_3$ is a monovalent radical derived from a hydroxyl compound of the class consisting of alcohols and phenols containing not more than 18 carbon atoms, and the sum of the carbon atoms of $R_2$ and $R_3$ does not exceed 25. Preferably the sum of the carbon atoms of $R_2$ and $R_3$ should not exceed 12.

These ether derivatives may be prepared by reacting the desired ester of the hydroxy monocarboxylic acid with sodium and then reacting the sodium derivative with a halide of the desired hydrocarbon radical represented by $R_1$ in the above formula. Also the halogenated ester such as ethyl- alpha- or beta-chlorpropionate, or the like, may be reacted with the sodium derivative of the desired alcohol, or phenol.

Merely to illustrate the preparation of a typical ether derivative in this class, the following example is given:—

Example 1.—One mol. of ethyl lactate was dissolved in xylene in a flask equipped with a reflux condenser. 1.10 mols. of freshly cut metallic sodium were added and, as the reaction progressed, the temperature of the reaction mixture was maintained by means of an oil bath so that refluxing was continuous. After completion of the reaction, indicated by lack of hydrogen evolution, 1.05 mols. of benzyl chloride were added and the mixture warmed for four hours to complete reaction. The reaction mixture was then poured into water and the organic layer separated, dried with calcium chloride and distilled. In this way the benzyl ether of ethyl lactate, having a boiling point of 235° C. at 760 mm., was obtained.

It will be understood that the above example is only to show one manner of preparing these ether derivatives, the particular method of preparing these compounds being irrelevant as far as the present invention is concerned.

Among the ether derivatives herein used as modifiers, benzyl ether of ethyl lactate disclosed above, benzyl ether of ethyl glycollate, boiling point 155° C. at 21 mm., and phenyl ether of ethyloxybutyrate, boiling point 190° C. at 23 mm., are particularly well adapted as plasticizers for cellulose derivative and resin compositions. All of these ether derivatives are suitable for modifying agents, being highly compatible with the cellulose derivatives and common resins employed in the coating and plastic arts.

In the formula representing these ether derivatives $R_1OR_2COOR_3$, $R_1$ is an aryl or aralkyl radical containing not more than 10 carbon atoms. Specific examples of such radicals are phenyl, tolyl, xylyl, chlorophenyl, chlorotolyl, benzyl, and phenylethyl radicals. $R_2$ is a divalent hydrocarbon radical containing not more than 17 carbon atoms, examples of which are $$-CH_2- \text{ to } -C_{17}H_{34}$$

including the various iso and branched chain analogues, as $$CH_3\overset{|}{C}H \text{ and } CH_3-\overset{|}{\underset{|}{C}}-CH_3$$

and $R_3$ is a monovalent radical derived from a hydroxyl compound of the class consisting of phenols and alcohols containing not more than 18 carbon atoms. Such radicals are exemplified by $$CH_3- \text{ to } C_{18}H_{37}-$$

derived from both branched chain and straight chain primary and secondary alcohols, methoxyethyl and similar lower alkoxy-alkyls and phenyl, benzyl, phenylethyl, tolyl radicals, and the like.

The ether derivatives coming within the present invention are only those wherein the sum of the carbon atoms in $R_2$ and $R_3$ do not exceed 25. For example, when $R_2$ is $-C_{17}H_{34}-$, $R_3$ must not be higher than $C_8H_{17}-$; or where $R_3$ is $C_{18}H_{35}-$, $R_2$ must not be higher than $-C_7H_{14}-$, and the highest molecular weight compound would be:

or

Compounds having a higher molecular weight than the above are not practically operative in the present invention because of their waxy nature and lack of compatibility with the ordinary plastic materials such as cellulose derivatives and resins. Furthermore, it is preferred that the sum of the carbon atoms of $R_2$ and $R_3$ should not exceed 12, particularly when used with cellulose acetate whose compatibility with these ether derivatives of higher molecular weights is not as pronounced as that of cellulose nitrate, the cellulose ethers, the higher organic acid esters of cellulose, as cellulose butyrate, and the various resins.

All of the ether derivatives here included are high boiling substantially colorless liquids or substantially white solids compatible with the usual solvents, diluents, and the like, used in the coating and plastic arts. Further, they are practically insoluble in water, relatively stable toward hydrolysis, and allow the addition of considerable amounts of waxes and resins to cellulose derivative compositions, as well as being suited for use as plasticizers or high boiling solvents for compositions which are essentially composed of resins.

In making cellulose derivative compositions employing the ether derivatives of the present invention, the compositions, whether plastics or solutions, may be made up in any of the usual ways of the art, the introduction of the particular modifiers herein described not necessitating departures from the standard practice. Thus, the modifiers may be worked with cellulose derivatives in a mixer with a small amount of solvent, or the cellulose derivative ingredient and modifier, either initially or after being made into a plastic, may be dissolved in a large amount of solvent to give a solution, or "dope", and the like, the modifier being a colloiding agent for the cellulose derivative component. Accordingly, in the various formulas given hereinafter in the specific examples, mention of volatile solvents, stabilizers, pigments, effect materials, and the like, is generally omitted for the sake of simplicity because, as will be understood by those skilled in the art, such ingredients may be used in accordance with the regular practice of the art, as by weight per 100 parts of cellulose derivative, 60-80 parts of a compatible volatile solvent when initially mixing a plastic, and 300-500 parts of solvent for a solution. After mixing, the plastic may be filtered, vacuum mixed, cake pressed, sheeted, and seasoned in accordance with standard practice. Likewise, the dope may be used in casting films and for coating compositions while the plastics may be used in molding compositions, as well as in the manner described above.

It has been found that, when the ether derivatives herein described are used, it is possible to add to the cellulose derivative plastic compositions greater quantities of such modifying agents as waxes and resins. The ether derivatives of the present type have been found to be excellent solvents for such waxes, as well as plasticizers for the cellulose derivatives.

The ether derivative modifiers herein described may be used with cellulose derivatives in general, including cellulose esters such as the nitrate, acetate, formate, propionate, laurate, and the like, mixed esters as the nitroacetate, acetobutyrate, and formoacetate, and cellulose ethers as methyl, ethyl, benzyl cellulose, and the like.

The ether derivative modifiers may be used with a single cellulose derivative or may be used with mixtures, as two or more different esters, or ethers, or an ester and an ether, and the like. These modifiers are compatible not only with each other but also with other types of modifiers so that they may be used alone or in combination with modifiers as camphor, acetanilide, ethyl acetanilide, ethylparatoluenesulfonamide, dibenzyl ether, phthalate esters, tertiary phosphoric acid esters, Montan wax, paraffin, and various other modifiers. It will be understood that, in combining modifiers, or volatile solvents when used, they should be so selected that they are, either of themselves or when mixed with the cellulose derivative, compatible with each other as well as with the cellulose derivative.

While the proportion of modifier to cellulose derivative or resin may be widely varied, it is advisable to use from 5-300 parts by weight of modifier per 100 parts of cellulose derivative or resin.

In order to illustrate the present invention, the following examples are given, parts being by weight:

*Example 2*

| | Parts |
|---|---|
| Cellulose nitrate | 100 |
| Benzyl ether of ethyl lactate | 25 |

*Example 3*

| | Parts |
|---|---|
| Cellulose acetate | 100 |
| Benzyl ether of ethyl lactate | 40 |

*Example 4*

| | Parts |
|---|---|
| Cellulose acetobutyrate | 100 |
| Benzyl ether of ethyl glycollate | 20 |

*Example 5*

| | Parts |
|---|---|
| Cellulose acetate | 50 |
| Cellulose propionate | 50 |
| Phenyl ether of ethyl oxybutyrate | 50 |

*Example 6*

| | Parts |
|---|---|
| Benzyl cellulose | 100 |
| Benzyl ether of ethyl lactate | 12.5 |

*Example 7*

| | Parts |
|---|---|
| Benzyl cellulose | 50 |
| Ethyl cellulose | 50 |
| Benzyl ether of ethyl glycollate | 30 |

*Example 8*

| | Parts |
|---|---|
| Ethyl cellulose | 50 |
| Methyl cellulose | 50 |
| Benzyl ether of ethyl glycollate | 27.5 |

Example 9

| | Parts |
|---|---|
| Cellulose nitrate | 50 |
| Ethyl cellulose | 50 |
| Benzyl ether of ethyl lactate | 27.5 |

Example 10

| | Parts |
|---|---|
| Cellulose acetate | 100 |
| Benzyl ether of ethyl glycollate | 10 |
| Triphenyl phosphate | 10 |

Example 11

| | Parts |
|---|---|
| Cellulose nitrate | 100 |
| Phenyl ether of ethyl oxybutyrate | 15 |
| Camphor | 15 |

Example 12

| | Parts |
|---|---|
| Benzyl cellulose | 100 |
| Benzyl ether of ethyl lactate | 15 |
| Thiotriphenyl phosphate | 10 |

Example 13

| | Parts |
|---|---|
| Cellulose acetate | 50 |
| Benzyl cellulose | 50 |
| Benzyl ether of ethyl lactate | 3.5 |
| Ethyl acetanilide | 10 |

Example 14

| | Parts |
|---|---|
| Cellulose acetobutyrate | 100 |
| Benzyl ether of ethyl lactate | 5 |
| Tricresyl phosphate | 10 |

In compositions wherein more than one cellulose derivative is used, as in Examples 5, 7, 8, and 9, the proportions of the derivatives to each other may be widely varied, as from 5–95% of one and 95–5% of the other, so that such a composition may be cellulose ester or ether 5–95 parts, different cellulose ester or ether, 95–5 parts, modifier 5–300 parts. In compositions where more than one modifier is used, as in Examples 10–14, the relative proportions of the modifiers to each other may be varied greatly, as from 0.33–99.67% of one and 99.67–0.33% of the other. However, it is preferable to use approximately equal parts of each of the modifiers, that is, 100 parts of the cellulose derivative and from 2.5 to 150 parts of each modifier.

The following example illustrates a composition containing a wax:—

Example 15

| | Parts |
|---|---|
| Ethyl cellulose | 100 |
| Montan wax | 50 |
| Benzyl ether of ethyl lactate | 20 |
| Dammar | 3 |
| Rosin | 2 |

It will be understood that the above examples are merely illustrative of formulæ which may be employed for making coating or plastic compositions and that the invention is by no means limited to these particular examples.

The ether derivatives herein described may be used as agents for compositing cellulosic plastics, preferably in sheet forms, to other layers, as metal, paper, glass, or plastic, the plastic containing or not containing the present ether derivatives as modifiers. The ether derivatives applied as cements may be used alone or mixed with volatile solvents, preferably a cellulose derivative solvent, with or without diluents, and with or without a cellulose derivative. Examples of such solutions are the following, parts being by weight:—

Example 16

| | Parts |
|---|---|
| Benzyl ether of ethyl lactate | 30 |
| Acetone | 70 |

Example 17

| | Parts |
|---|---|
| Cellulose nitrate | 10 |
| Benzyl ether of ethyl lactate | 30 |
| Acetone | 25 |
| Ethyl acetate | 20 |
| Amyl acetate | 10 |

Example 18

| | Parts |
|---|---|
| Cellulose acetate | 15 |
| Benzyl ether of ethyl glycollate | 20 |
| Acetone | 30 |
| Ethyl acetate | 25 |
| Amyl acetate | 10 |

Example 19

| | Parts |
|---|---|
| Benzyl cellulose | 10 |
| Benzyl ether of ethyl lactate | 15 |
| Toluene | 30 |
| Alcohol | 5 |
| Ethyl acetate | 40 |

Obviously other solvents, others of the herein described ether derivative modifiers, diluents, and other substances which may or may not be solvents, may be used, such as methyl ethyl ketone, diethylene dioxide, alcohol, methanol, ethyl formate, amyl acetate, toluene, and various combinations thereof. Proportions would be widely varied, as circumstances determined.

In any of the cellulose derivative compositions herein described additional ingredients for particular purposes may be added, such as coloring materials and fillers. Thus, for fillers may be used wood flour, ground alpha cellulose, starch, barytes, rottenstone, zinc oxide, palm nut wood flour, or any of the common organic or inorganic fillers. Also resins or gums may be added. Waxes and similar substances can be added in amounts greater than would be practical with plasticizers heretofore known. A composition within the following range would be suitable, parts being by weight: cellulose derivative, 100 parts, modifier, 2–150 parts, filler, 10–150 parts. The following specific example illustrates a composition employing filler:

Example 20

| | Parts |
|---|---|
| Benzyl cellulose | 100 |
| Benzyl ether of ethyl lactate | 15 |
| Zinc oxide | 300 |

The use of the ether derivatives of the class herein described that are liquid at ordinary temperature, is preferable, but solid modifiers may be used and, if advisable, may be dissolved in suitable solvents before incorporation.

The invention has been illustrated in the specific examples with respect to cellulose derivative compositions but the ether derivatives disclosed may also be used as modifiers for a large class of resins such as polymerized acrylic and methacrylic acid derivatives, e. g. polymerized methyl alpha methacrylate, ethyl alpha methacrylate; methyl acrylate; vinyl resins, e. g. polyvinyl acetate, polyvinyl chloride, polystyrene, aldehyde, modified polyvinyl resins and polyhydric alcohol-polybasic acid resins, and phenol-formaldehyde and urea-formaldehyde resins.

It is to be noted that most of the above resins, as well as the cellulose derivatives, are organic plastic substances containing a plurality of C—O—C linkages, either in the form of ester linkages or ether linkages. While the invention is not to be limited by the theory or explanation here given, it is of interest that the ether derivatives of the present invention which are useful as modifiers, also contain the C—O—C linkages themselves, and it may be due to this fact that they are useful as plasticizers for the organic plastic substances containing a plurality of such linkages.

The compositions according to the present invention may be used in general for all purposes to which coating and plastic compositions are put, such as lacquers and dopes for coating all types of surfaces and in plastic compositions to be used in the preparation of toilet ware, novelties, sheeting, rods, tubes, safety glass interlayers, and the like.

An advantage of the present invention is that it provides compositions containing modifiers characterized by their water insolubility, resistance to hydrolysis, and chemical stability. A further advantage in these compositions is that they permit the addition of considerable amounts of waxes and resins to cellulose derivative compositions not heretofore possible with the available plasticizers.

As many apparently widely different embodiments of this invention may be made without departing from the spirit and scope thereof, it is to be understood that the invention is not limited to the specific embodiments thereof except as defined in the appended claims.

I claim:

1. A composition comprising a cellulose derivative and, as a modifier therefor, benzyl ether of ethyl glycollate.

2. A composition comprising a cellulose derivative and, as a modifier therefor, benzyl ether of ethyl lactate.

3. A composition comprising a cellulose derivative and, as a modifier therefor, the benzyl ether of the ethyl ester of an acid from the group consisting of glycollic and lactic acids.

4. A composition comprising a cellulose ether and, as a modifier therefor, the benzyl ether of ethyl lactate.

5. A composition comprising cellulose nitrate and, as a modifier therefor, the benzyl ether of ethyl lactate.

BARNARD M. MARKS.